US012783319B2

(12) United States Patent
Saur et al.

(10) Patent No.: US 12,783,319 B2
(45) Date of Patent: Nov. 3, 2026

(54) VERTICAL SCALING OF COMPUTE CONTAINERS

(71) Applicant: Microsoft Technology Licensing, LLC, Redmond, WA (US)

(72) Inventors: Karla Jean Saur, Seattle, WA (US); Joyce Yu Cahoon, Woodinville, WA (US); Yiwen Zhu, San Francisco, CA (US); Anna Pavlenko, Edmonds, WA (US); Jesus Camacho Rodriguez, Sunnyvale, CA (US); Brian Paul Kroth, Madison, WI (US); Travis Austin Wright, Issaquah, WA (US); Michael Edward Nelson, Redmond, WA (US); David Liao, Sammamish, WA (US); Andrew Sherman Carter, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 496 days.

(21) Appl. No.: 18/472,947

(22) Filed: Sep. 22, 2023

(65) Prior Publication Data

US 2024/0411609 A1 Dec. 12, 2024

Related U.S. Application Data

(60) Provisional application No. 63/507,056, filed on Jun. 8, 2023.

(51) Int. Cl.
*G06F 9/50* (2006.01)

(52) U.S. Cl.
CPC ............ *G06F 9/505* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 12,277,445 | B2 * | 4/2025 | Shami | G06F 9/5038 |
| 2014/0058573 | A1 * | 2/2014 | Schlabe | H02J 3/008 700/291 |
| 2017/0269854 | A1 * | 9/2017 | Dimnaku | G06F 3/065 |
| 2018/0027055 | A1 * | 1/2018 | Balle | G02B 6/3882 |

(Continued)

OTHER PUBLICATIONS

Taherizadeh et al. ("Key Influencing Factors of the Kubernetes Auto-Scaler for Computing Intensive Microservice-Native Cloud-Based Applications": Advances in Engineering Software, Elsevier Science, Oxford, GB, vol. 140, Nov. 8, 2019, pp. 1-11.*

(Continued)

*Primary Examiner* — Olabode Akintola

(57) ABSTRACT

System, methods, apparatuses, and computer program products are disclosed for auto-scaling of a deployment based on resource utilization data for a workload executing on the deployment. A resource availability is determined based on the resource utilization data and a current resource allocation of the deployment. A severity of resource throttling of the workload may be determined based on the resource utilization data, and a scaling factor is determined based at least on the severity of resource throttling. In response to at least the resource availability satisfying a predetermined condition with a predetermined threshold, the deployment is scaled based on the scaling factor.

17 Claims, 6 Drawing Sheets

(56) References Cited

U.S. PATENT DOCUMENTS

| | | | | |
|---|---|---|---|---|
| 2023/0259408 | A1* | 8/2023 | Grushka | G06F 9/505 718/105 |
| 2024/0015080 | A1* | 1/2024 | Illikkal | G06F 9/5011 |
| 2024/0411603 | A1* | 12/2024 | Beam | G06F 9/5027 |
| 2025/0328377 | A1* | 10/2025 | Alsop | G06F 9/5038 |

OTHER PUBLICATIONS

International Search Report and Written Opinion received for PCT Application No. PCT/US2024/030901, Oct. 8, 2024, 16 pages.
Qu, et al., "Auto-Scaling Web Applications in Clouds", arxiv.org, Cornell University Library, 201 Olin Library Cornell University Ithaca, NY 14853, vol. 51, No. 4, Jul. 13, 2018, pp. 1-33.
Tang, et al., "Quantifying Cloud Elasticity with Container-Based Autoscaling", 2017 IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress (Dasc/Picom/Datacom/Cybersci, Nov. 6, 2017, pp. 853-860.
International Preliminary Report on Patentability (Chapter I) received for PCT Application No. PCT/US2024/030901, mailed on Dec. 18, 2025, 7 pages.
Nguyen, et al., "Horizontal Pod Autoscaling in Kubernetes for Elastic Container Orchestration", In Journal of Sensors, vol. 20, Issue 16, Aug. 17, 2020, pp. 1-18.
Lee, Nate, "How to Test Autoscaling in Kubernetes", Retrieved from: https://speedscale.com/blog/how-to-test-kubernetes-autoscaling/, Aug. 18, 2022, 17 Pages.
Phuc, et al., "Traffic-Aware Horizontal Pod Autoscaler in Kubernetes-Based Edge Computing Infrastructure", In Journal of IEEE Access, vol. 10, Feb. 10, 2022, pp. 18966-18977.
Podolskiy, et al., "IaaS Reactive Autoscaling Performance Challenges", In Proceedings of the IEEE 11th International Conference on Cloud Computing, Jul. 2, 2018, pp. 954-957.
Podolskiy, Vladimir, "Multilayered Autoscaling Policies Simulation Toolbox", Retrieved from: https://github.com/Remit/autoscaling-simulator, May 8, 2021, 6 Pages.
Podolskiy, Vladimir, "Predictive Autoscaling for Multilayered Cloud Deployments", In the Thesis of Faculty of Computer Science, Technical University of Munich, 2021, 183 Pages.
Poppe, et al., "Seagull: An Infrastructure for Load Prediction and Optimized Resource Allocation", In Proceedings of the VLDB Endowment, vol. 14, Issue 2, Sep. 27, 2020, pp. 154-162.
Pronin, Sergey, "DBaaS on Kubernetes: Under the Hood", Retrieved from: https://www.percona.com/blog/dbaas-on-kubernetes-under-the-hood/, Feb. 8, 2021, 20 Pages.
Reiss, et al., "Heterogeneity and Dynamicity of Clouds at Scale: Google Trace Analysis", In Proceedings of the Third ACM Symposium on Cloud Computing, Oct. 14, 2012, 13 Pages.
Rzadca, et al., "Autopilot: Workload Autoscaling at Google", In Proceedings of the Fifteenth European Conference on Computer Systems, Apr. 27, 2020, 16 Pages.
Shutian, et al., "Alibaba Cluster Trace Program", Retrieved from: https://github.com/alibaba/clusterdata, Jun. 27, 2023, 5 Pages.
Smith, et al., "Vertical Pod Autoscaler Operator", Retrived from: https://github.com/openshift/vertical-pod-autoscaler-operator, Jul. 1, 2023, 3 Pages.
Sun, et al., "ROSE: Cluster Resource Scheduling via Speculative Over-Subscription", In Proceedings of the IEEE 38th International Conference on Distributed Computing Systems, Jul. 2, 2018, pp. 949-960.
Taylor, et al., "Forecasting at scale", In Journal of the American Statistician, vol. 72, Issue 1, Apr. 24, 2018, 25 Pages.
Tigani, Jordan, "The Simple Joys of Scaling Up", Retrieved from: https://motherduck.com/blog/the-simple-joys-of-scaling-up/, May 11, 2023, 24 Pages.
Toka, et al., "Adaptive AI-based Auto-scaling for Kubernetes", In Proceedings of the 20th IEEE/ACM International Symposium on Cluster, Cloud and Internet Computing, May 11, 2020, pp. 599-608.
Wang, et al., "Predicting CPU Usage for Proactive Autoscaling", In Proceedings of the 1st Workshop on Machine Learning and Systems, Apr. 26, 2021, 8 Pages.
Wang, Thomas, "Predictive Vertical CPU Autoscaling in Kubernetes based on Time-series Forecasting with Holt-Winters Exponential Smoothing and Long Short-term Memory", In Degree Project of Computer Science and Engineering, Apr. 16, 2021, 64 Pages.
Wang, et al., "Predictive-Vpa-Recommenders", Retrieved from: https://github.com/openshift/predictive-vpa-recommenders, Oct. 5, 2022, 4 Pages.
Wei, et al., "A Reinforcement Learning Based Auto-Scaling Approach for SaaS Providers in Dynamic Cloud Environment", In the Journal of Mathematical Problems in Engineering, Feb. 3, 2019, 12 Pages.
Zhao, et al., "Tiny Autoscalers for Tiny Workloads: Dynamic CPU Allocation for Serverless Functions", In Proceedings of the 22nd IEEE International Symposium on Cluster, Cloud and Internet Computing, May 16, 2022, pp. 170-179.
"Amazon Elastic Kubernetes Service", Retrieved from: https://aws.amazon.com/eks/, Retrieved Date: Mar. 22, 2023, 7 Pages.
"Automatically Adjust Pod Resource Levels with the Vertical Pod Autoscaler", Retrieved From: https://docs.openshift.com/container-platform/4.9/nodes/pods/nodes-pods-vertical-autoscaler.html, Retrieved Date: Mar. 22, 2023, 21 Pages.
"Azure Kubernetes Service (AKS)", Retrieved from: https://azure.microsoft.com/en-us/products/kubernetes-service/, Retrieved Date: Mar. 22, 2023, 9 Pages.
"Azure. Invent with Purpose", Retrieved from: https://azure.microsoft.com/en-in, Retrieved Date: Mar. 22, 2023, 11 Pages.
"IBM Cloud Databases for PostgreSQL", Retrieved from: https://www.ibm.com/cloud/databases-for-postgresql, Retrieved Date: Mar. 22, 2023, 8 Pages.
"Pareto Front", Retrieved from: https://en.wikipedia.org/wiki/Pareto_front, Oct. 6, 2005, 4 Pages.
"Production-Grade Container Orchestration", Retrieved from: https://kubernetes.io/, Retrieved Date: Mar. 22, 2023, 6 Pages.
"Reinvent Your Business with Data", Retrieved from: https://aws.amazon.com/, Retrieved Date: Mar. 22, 2023, 7 Pages.
"Report Shows Increased Revenue and Productivity for Organizations Running Data on Kubernetes (DoK)", Retrieved from: https://www.businesswire.com/news/home/20221018005631/en/Report-Shows-Increased-Revenue-and- Productivity-for-Organizations-Running-Data-on-Kubernetes-DoK, Oct. 18, 2022, 2 Pages.
"Resource Management for Pods and Containers", Retrieved from: https://kubernetes.io/docs/concepts/configuration/manage-resources-containers/, May 31, 2023, 12 Pages.
"StatefulSets", Retrieved from: https://kubernetes.io/docs/concepts/workloads/controllers/statefulset/, Apr. 4, 2023, 8 Pages.
"Student's t-test", Retrieved from: https://en.wikipedia.org/wiki/Student%27s_t-test#Paired_samples, Mar. 3, 2022, 17 Pages.
"The Most Scalable and Fully Automated Kubernetes Service", Retrieved from: https://cloud.google.com/kubernetes-engine, Retrieved Date: Mar. 22, 2023, 13 Pages.
"Use Case 6: Use the Autoscaler in Simulation Mode to Learn Service Behavior Without Scaling the Target Service", Retrieved from: https://docs.vmware.com/en/VMware-Tanzu-Service-Mesh/services/service-autoscaling-with-tsm-user-guide/GUID-54E2BDEC-283F-4BB7-A786-5E260E806EF5.html, Retrieved Date: Mar. 22, 2023, 6 Pages.
"Vertical Pod Autoscaler", Retrieved from: https://github.com/kubernetes/autoscaler/tree/master/vertical-pod-autoscaler, Jul. 3, 2023, 13 Pages.
Akmal, et al., "Welcome to Sktime", Retrieved from: https://github.com/sktime/sktime/tree/main, Jul. 12, 2023, 5 Pages.
Aslanpour, et al., "AutoScaleSim: A Simulation Toolkit for Auto-scaling Web Applications in Clouds", In the Journal of Simulation Modelling Practice and Theory, vol. 108, Apr. 1, 2021, pp. 1-54.
Baresi, et al., "A Simulation-based Comparison between Industrial Autoscaling Solutions and COCOS for Cloud Applications", In Proceedings of the IEEE International Conference on Web Services, Oct. 19, 2020, pp. 94-101.

(56) References Cited

OTHER PUBLICATIONS

Cahoon, et al., "Doppler: Automated SKU Recommendation in Migrating SQL Workloads to the Cloud", In Repository of arXiv:2208.04978v1, Aug. 9, 2022, 13 Pages.
Cardas, et al., "On the Performance of SQL Scalable Systems on Kubernetes: A Comparative Study", In the Journal of Cluster Computing, vol. 26, Sep. 9, 2022, pp. 1935-1947.
Celik, Mesut, "High Performance Cloud-Native Microservices With Distributed Caching", Retrieved form: https://files.devnetwork.cloud/DeveloperWeekAustin/presentations/2019/Mesut-Celik.pdf, Nov. 7, 2019, 29 Pages.
Coussement, et al., "Interpretable Data Science for Decision Making", In the Journal of Decision Support Systems, vol. 150, Nov. 2021, 18 Pages.
Das, et al., "Automated Demand-driven Resource Scaling in Relational Database-as-a-Service", In Proceedings of International Conference on Management of Data, Jun. 26, 2016, pp. 1923-1934.
Dean, et al., "The Tail at Scale", In the Journal of Communications of the ACM, vol. 56, Issue 2, Feb. 1, 2013, pp. 74-80.
Difallah, et al., "OLTP-Bench: An Extensible Testbed for Benchmarking Relational Databases", In Proceedings of the VLDB Endowment, vol. 7, Issue 4, Dec. 1, 2013, pp. 277-288.
Dillon, Charlotte, "How to Run a Software-ss-a-Service on Kubernetes", Retrieved from: https://www.cockroachlabs.com/blog/kubernetes-saas-implementation/, Sep. 14, 2020, 10 Pages.
Evangelidis, et al., "Performance Modelling and Verification of Cloud-Based Auto-Scaling Policies", In Proceedings of the 17th IEEE/ACM International Symposium on Cluster, Cloud and Grid Computing, May 14, 2017, pp. 355-364.
Fe, et al., "Performance-Cost Trade-Off in Auto-Scaling Mechanisms for Cloud Computing", In Journal of Sensors, vol. 22, Issue 3, Feb. 5, 2022, pp. 1-25.
Florescu, et al., "Rethinking Cost and Performance of Database Systems", In the Journal of Special Interest Group on Management of Data, vol. 38, Issue 1, Mar. 2009, pp. 43-48.
Georgiou, et al., "Towards Auto-Scaling Existing Transactional Databases with Strong Consistency", In Proceedings of the IEEE 35th International Conference on Data Engineering Workshops, Apr. 8, 2019, pp. 107-112.
Gong, et al., "PRESS: PRedictive Elastic ReSource Scaling for Cloud Systems", In Proceedings of International Conference on Network and Service Management, Oct. 25, 2010, pp. 9-16.
Gray, et al., "The Dangers of Replication and a Solution", In Proceedings of the ACM SIGMOD International Conference on Management of Data, vol. 25 Issue 2, Jun. 1, 1996, pp. 173-182.
Gujarati, et al., "Swayam: Distributed Autoscaling to Meet SLAs of Machine Learning Inference Services with Resource Efficiency", In Proceedings of the 18th ACM/IFIP/USENIX Middleware Conference, Dec. 11, 2017, pp. 109-120.
Hamzeh, et al., "A New Approach to Calculate Resource Limits with Fairness in Kubernetes", In Proceedings of the First International Conference on Digital Data Processing, Nov. 15, 2019, pp. 51-58.
Heo, Tejun, "Control Group v2", Retrieved from: https://www.kernel.org/doc/html/latest/admin-guide/cgroup-v2.html, Oct. 2015, 64 Pages.
Huang, et al., "A Top-Down Approach to Achieving Performance Predictability in Database Systems", In Proceedings of the ACM International Conference on Management of Data, May 14, 2017, pp. 745-758.
Huang, et al., "Auto Scaling Virtual Machines for Web Applications With Queueing Theory.", In Proceedings of the 3rd International Conference on Systems and Informatics, Nov. 19, 2016, pp. 433-438.
Jindal, et al., "Performance Modeling for Cloud Microservice Applications", In Proceedings of the ACM/SPEC International Conference on Performance Engineering, Apr. 7, 2019, pp. 25-32.
Kalavri, et al., "Three Steps Is All You Need: Fast, Accurate, Automatic Scaling Decisions for Distributed Streaming Dataflows", In Proceedings of the 13th USENIX Symposium on Operating Systems Design and Implementation, Oct. 8, 2018, pp. 783-798.
Kemme, et al., "Database Replication: A Tale of Research Across Communities", In Proceedings of the VLDB Endowment, vol. 3, Issue 1-2, Sep. 1, 2012, pp. 5-12.
Klinaku, et al., "Hitchhiker's Guide for Explainability in Autoscaling", In Proceedings of the Companion of the ACM/SPEC International Conference on Performance Engineering, Apr. 15, 2023, pp. 277-282.
Krishnan, et al., "Overview of Data Migration Assistant", Retrieved from: https://learn.microsoft.com/en-us/sql/dma/dma-overview?view=sql-server-ver16, Mar. 10, 2023, 4 Pages.
Kulkarni, et al., "In-Place Update of Pod Resources", Retrieved from: https://github.com/kubernetes/enhancements/issues/1287, Oct. 8, 2019, 18 Pages.
Lahiri, et al., "Oracle TimesTen: An In-Memory Database for Enterprise Applications", In Bulletin of the IEEE Computer Society Technical Committee on Data Engineering, vol. 36, Issue 2, Jun. 2013, pp. 6-13.
Levy, Noam, "Between Predictable and Practical—On Kubernetes Limits", Retrieved from: https://www.groundcover.com/blog/kubernetes-limits, Jun. 15, 2022, 15 Pages.
Lorido-Botran, et al., "A Review of Auto-scaling Techniques for Elastic Applications in Cloud Environments", In Journal of Grid Computing, vol. 12, Oct. 11, 2014, pp. 559-592.
Mistry, et al., "Introducing Microsoft SQL Server", In Publication of Microsoft Press, Apr. 15, 2014, 144 Pages.
Narasayya, et al., "Sharing Buffer Pool Memory in Multi-Tenant Relational Database-as-a-Service", In Proceedings of the VLDB Endowment, vol. 8, Issue 7, Feb. 1, 2015, pp. 726-737.
Narasayya, et al., "SQLVM: Performance Isolation in Multi-tenant Relational Database-as-a-Service", In Proceedings of the 6th Biennial Conference on Innovative Data Systems Research, Jan. 6, 2013, 9 Pages.
Nethi, et al., "Azure Arc-enabled SQL Managed Instance Overview", Retrieved from: https://learn.microsoft.com/en-us/azure/azure-arc/data/managed-instance-overview, Sep. 20, 2022, 2 Pages.

* cited by examiner

400

VERTICAL SCALING OF COMPUTE CONTAINERS

CROSS-REFERENCE TO RELATED APPLICATIONS

This application claims priority to U.S. Provisional Patent Application Ser. No. 63/507,056, filed Jun. 8, 2023, and titled "VERTICAL SCALING OF COMPUTE CONTAINERS," the entirety of which is incorporated by reference herein.

BACKGROUND

A container is an isolated instance of a user space in a computing system. A computer program executed on an ordinary operating system can view the resources (e.g., connected devices, files and folders, network shares, processor power, quantifiable hardware capabilities) of the computing system on which the container operates. However, programs running inside a container can only see the contents of the container (e.g., data, files, folders, applications, etc.) and devices assigned to the container.

A computer cluster is a set of computing machines or virtual machines that work together such that they may be viewed as a single system. Container deployment in a cluster involves running multiple containers across a cluster of interconnected machines or virtual machines. Each container encapsulates an application along with its dependencies and runs in an isolated environment. In container deployment, a cluster orchestration system, such as Kubernetes®, manages the lifecycle of containers, ensuring they are scheduled to run on appropriate nodes within the cluster. The orchestration system handles tasks such as load balancing, scaling, and automated recovery, making it easier to manage and scale containerized applications. The orchestration system may scale containerized applications by adding additional instances (horizontal scaling), or by assigning additional resources to existing instances (vertical scaling).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

System, methods, apparatuses, and computer program products are disclosed for auto-scaling of a deployment based on resource utilization data for a workload executing on the deployment. A resource availability is determined based on the resource utilization data and a current resource allocation of the deployment. A severity of resource throttling of the workload may be determined based on the resource utilization data, and a scaling factor is determined based at least on the severity of resource throttling. In response to at least the resource availability satisfying a predetermined condition with a predetermined threshold, the deployment is scaled based on the scaling factor.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 5A:
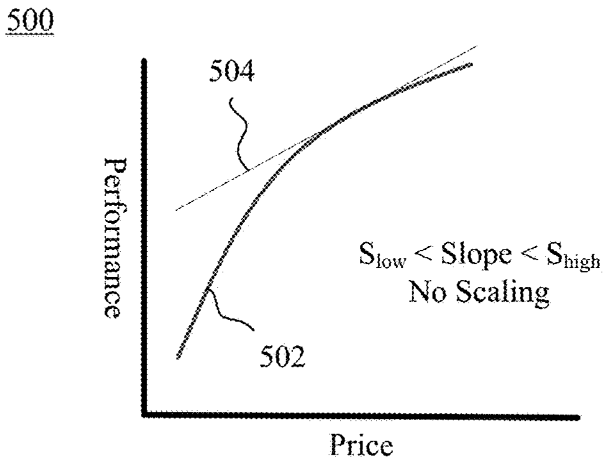
Figure 5B:
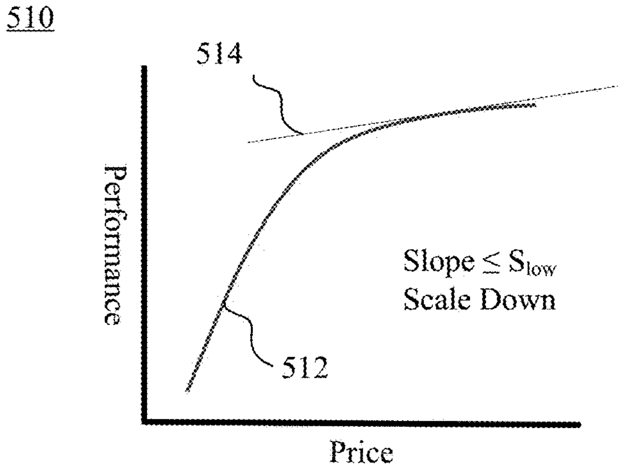
Figure 5C:
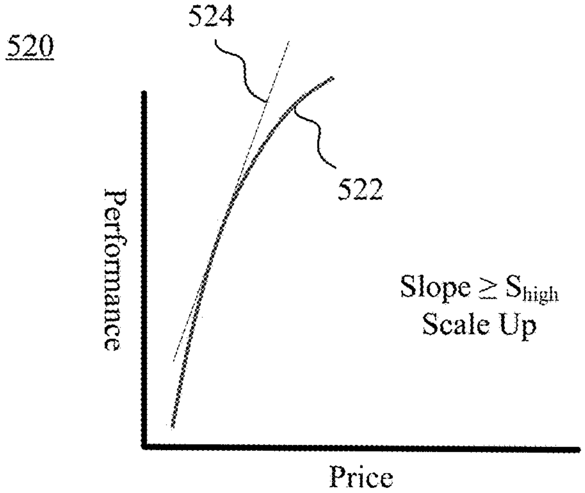

FIGS. 5A, 5B, and 5C depict exemplary price-performance curves for vertical auto-scaling of compute instances, in accordance with an embodiment.

Figure 6:
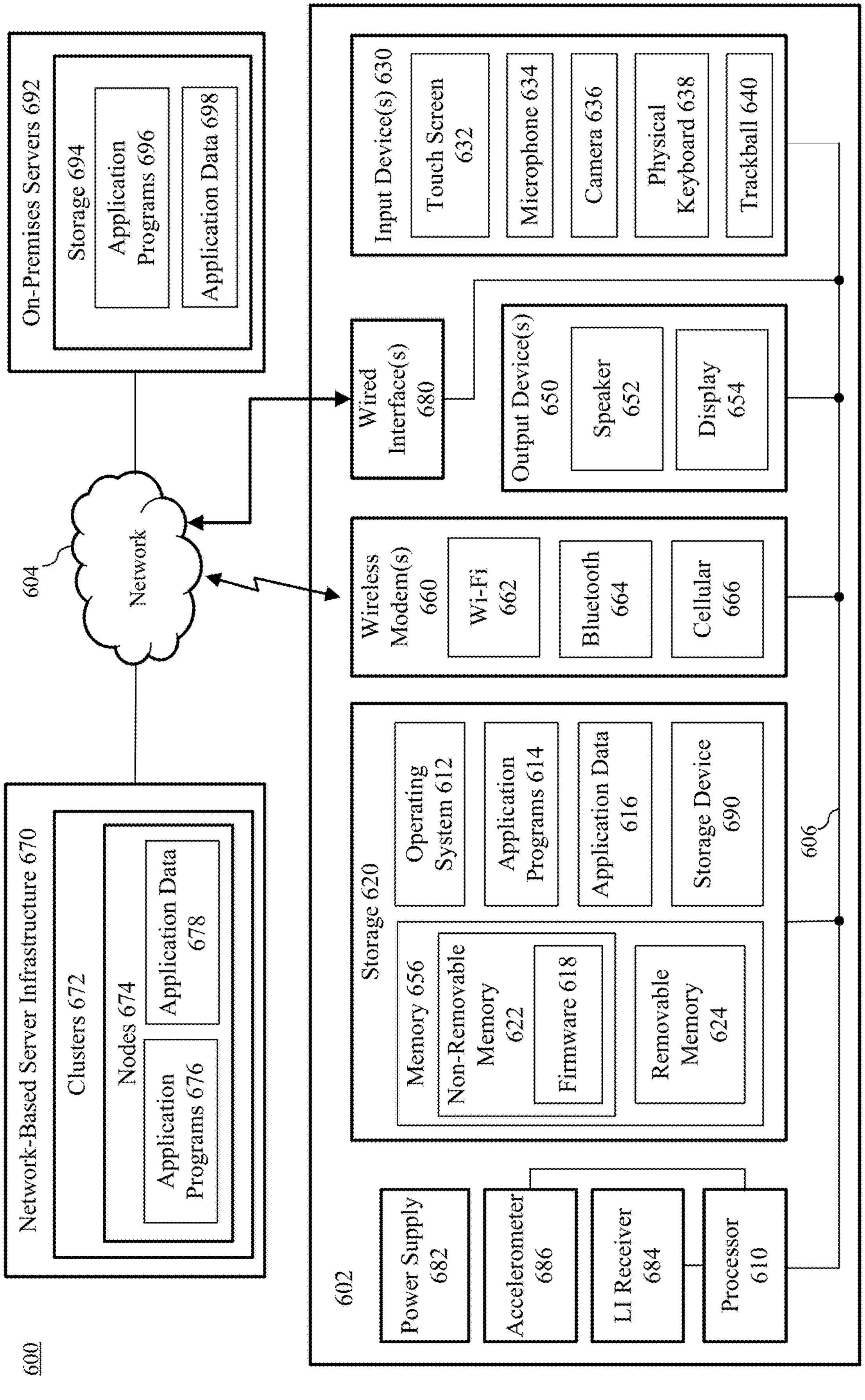

FIG. 6 shows a block diagram of an example computer system in which embodiments may be implemented.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As used herein, the term "subset" of a cluster is defined as one or more nodes of the cluster. In some instances, the subset of the cluster may be the same as the cluster and include every node of the cluster.

II. Example Embodiments

Auto-scaling is an aspect of workload management for obtaining additional compute capacity to meet higher demand (upscale) and release unused or underused capacity during periods of reduced activity to save operational costs (downscale). The primary goal of cluster auto-scaling is to optimize resource allocation and minimize costs by scaling the cluster's capacity according to workload fluctuations. By dynamically adjusting the cluster size, cluster auto-scaling enables efficient resource utilization, improved application performance, and cost savings. It allows organizations to automatically respond to varying workloads and ensure that the cluster is correctly sized without manual intervention.

Auto-scaling may be performed by scaling horizontally, by adding or removing replicas, or by scaling vertically, by adding or removing resources to existing instances. Horizontal auto-scaling may work well for some services, it is not well suited for monolithic systems (e.g., databases) that have a fixed number of total instances (e.g., single writable primary instance) and/or cannot quickly scale horizontally due to the size of data copy operations inherent to creating new replicas. An important tool is the capability to do vertical scaling: to add or remove resources from existing replicas. For such scenarios, vertical auto-scaling may provide benefits such as, but not limited to, simplicity, performance, and reliability.

In Kubernetes®, containers are grouped into pods, which serve as the fundamental unit for scheduling on Kubernetes® cluster nodes. Additionally, pods can be part of a stateful set, of identical pod instances or replicas, for stateful applications that require persistent volumes for storage. These replicas can be distributed across multiple nodes to provide high-availability (HA). In Kubernetes®, two mechanisms, "requests" and "limits," define resource allocation for applications. The "requests" mechanism ensures a minimum allocation and assists with node placement, while "limits" set upper boundaries (to ensure fairness in multi-tenant environments, for example). A scheduler may use "requests" specifications on various dimensions (e.g., CPU core time, memory, I/O, storage, etc.) to define resource boundaries for scheduling pods onto nodes, and "limits" specifications to prevent a single pod from monopolizing resources, thereby preserving the performance and stability of other pods on the same node. In embodiments, both "requests" and "limits" are specified at the container level within a pod and are applied to all replicas in a stateful set.

In embodiments, vertical auto-scaling may be achieved by, for example, adjusting the parameters for the requests and the limits specifications. For example, Kubernetes® offers a Vertical Pod Autoscaler (VPA) for dynamic resource adjustment, including a component that monitors utilization and calculates target values for the requests and limits specifications. However, the VPA of Kubernetes® employs a predictive-based approach that may be hindered by inaccurate predictions.

Embodiments disclosed herein include a hybrid autoscaling algorithm that integrates a clean-slate, history-independent reactive algorithm with a predictive proactive approach based on historical time-series data to make informed decisions regarding resource requirements. By using predictions to adjust resources in real-time, embodiments disclosed herein allocate sufficient resources for smooth operation without causing throttling, while also minimizing excessive resource slack to improve cost-efficiency. In embodiments, customizable parameters are provided to allow users (e.g., tenants) to prioritize availability, cost-efficiency, and/or performance based on their specific workload requirements. Additionally, in embodiments, an interactive simulator may be provided to the user to aid the user in understanding different trade-offs when fine-tuning of the customizable parameters.

When scaling applications on top of certain platforms, such as, but not limited to Kubernetes®, each resource type (i.e., dimension) can be scaled independently and each resource scaling problem can be treated separately. In embodiments, scaling decisions for a particular type of resource (e.g., memory, storage, I/O, etc.) may be determined based on the current allocation of the resource and a usage pattern of the resource for some available time period. For example, a scaling decision at time T for a computational resource (CPU) may be expressed as:

$$a(t) = \text{AUTOSCALE}\ (CoreCount_{current}, \{X_t\}) \qquad \text{Equation 1}$$

where $\text{CoreCount}_{current}$ is the current number of CPUs allocated, $X_t$ is the observed CPU usage pattern for some available time period t={0, 1, . . . . T−1}, and α is the subsequent autoscaling action at time T.

Once containers are running on the nodes, their specifications are enforced to ensure that containers are allocated the specified minimum resources (requests) and do not exceed the specified maximum resources (limits). For example, CPU resources allocation may refer to CPU time rather than a number of cores. If the combined CPU time of the threads within a container reaches the limits specification within a given time quanta, they are removed and not scheduled by the OS, even if they are considered "runnable." This scenario is referred to as throttling.

In embodiments, the severity of resource throttling may be estimated using price-performance curves by examining the slope and/or skew of the distribution of slopes derived from these curves, and may be used to make auto-scaling decisions. For example, in embodiments, a logarithmic decay function based on the slope and/or skew of the distribution of slopes derived from the price-performance curve may be used to determine a scaling factor (SF), or the amount of resources to scale up (or down) by. For example, $$SF(\text{slope, skew}) = a \times \log \times \text{slope} + r_{min}) \qquad \text{Equation 2}$$

where a is a multiplicative factor, slope represents the slope at the current resource allocation of a user's (e.g., tenant's) corresponding price-performance curve (estimated based on the usage data), skew represents the skew of the distribution of the existing slopes derived from the price-performance curve, and Imin represents a minimum amount of the resource required by the pod. In embodiments, by letting the multiplicative factor a be driven by the skew of the distribution of slopes derived from the price-performance curve, the function SF (slope, skew) is able to dynamically capture the desired number of cores to scale by.

In embodiments, calculation of the scaling factor may further include one or more guardrails. In embodiments, a guardrail for the minimum amount of a resource required to operate a pod (i.e., $r_{min}$) to prevent nonsensical autoscaling decisions that could result in a service outage. This approach approximates the throttling that a tenant may experience and provides a means of evaluating how well each resource allocation meets the tenant's performance needs. In embodiments, guardrails may also include, but are not limited to, a maximum amount of a resource allocatable to a pod, a limit on the amount of resources that may be scaled-up in a single step, a limit on the amount of resources that may be scaled-down in a single step, a minimum amount of resource slack (e.g., spare capacity buffer), and/or a maximum amount of resource slack.

In embodiments, the severity of resource throttling may also be employed to trigger auto-scaling of the resource. For example, when the slope at the current resource allocation of the corresponding price-performance curve is greater than a high threshold, a decision may be made to auto-scale up, and when the slope at the current resource allocation of the corresponding price-performance curve is lower than a low threshold, a decision may be made to auto-scale down. The high threshold and/or low threshold may be determined manually (e.g., by a domain expert), automatically, and/or dynamically based on available information, such as, but not limited to, expertise in the field, historical workload data, a heuristic model, and/or a machine-learning model.

In embodiments, where the slope at the current resource allocation of the corresponding price-performance curve is approximately zero ("0") and the current resource allocation is at the top of the corresponding price-performance curve, the pod may be auto-scaled down to a point on the price-performance curve representing the lowest cost resource allocation that can meet the workload requirements at 100% utilization. This point on the price-performance curve may be determined using various techniques, such as, but not limited to machine learning models, heuristic models, statistical models, and/or the like.

In embodiments, where the slope at the current resource allocation of the corresponding price-performance curve is approximately zero ("0") and the current resource allocation is at the bottom of the corresponding price-performance curve, autoscaling may not be necessary if the current resource allocation is still meeting up to 99% of the utilization need.

In scenarios, determining the high threshold and/or low threshold may be difficult. As such, in embodiments, auto-scaling decisions may be based on an amount of resource slack (i.e., amount of resources that are currently unused). For example, when the slack is very low, workloads are likely pushing up against the current resource limits, and a decision may be made to auto-scale up. Conversely, when the slack is very high, there may be a lot of unused capacity, and a decision may be made to auto-scale down.

In embodiments, the scaling factor (SF) may further consider forecasted usage data in addition to observed or historical usage data (e.g., $\{X_t\}$). The use of forecasted usage data may be beneficial for predicting future resource demands of cyclical workloads. For example, during an initial period, the algorithm may operate in a reactive mode based on observed resource utilization data because insufficient historical usage data has been gathered to generate a forecast. However, after the initial period, when enough historical data is encountered in a forecasting window to form a useful prediction for a cyclical workload, the algorithm may, in embodiments, operate in a proactive mode based on both historical utilization data and forecasted utilization data. In embodiments, the forecasting window may be determined manually (e.g., by a domain expert), automatically, and/or dynamically based on available information, such as, but not limited to, expertise in the field, historical workload data, a heuristic model, and/or a machine-learning model. When enough historical data is observed to form a useful prediction, a window (e.g., 40 minutes) of observed resource utilization data is combined with a window of predicted data (i.e., a forecasting horizon) to form a combined window. In embodiments, auto-scaling of instances may be performed based on the combined window of resource utilization data that includes the observed resource utilization data and the forecasted resource utilization data.

In embodiments, the observed usage data (e.g., $\{X_t\}$) may be used to predict future usage data using a predictive component. The predictive component may, in embodiments, be a pluggable component that allows a user (e.g., tenant, customer, etc.) to employ different prediction algorithms as necessary, for example, for different types of workloads. In embodiments, forecasting may be performed using various techniques, such as, but not limited to, pattern matching algorithms (e.g., Naïve algorithm), machine learning models, heuristic models, statistical models, and/or the like. In such embodiments, a scaling decision at time T for a computational resource (CPU) may be expressed as:

$$a(t) = \text{AUTOSCALE}\left(CoreCountCurrent_{aug}, \{X_t\}, \{\hat{X}_t\}\right) \quad \text{Equation 3}$$

where $\text{CoreCountCurrent}_{aug}$ is equal to max $(\text{CoreCount}_{Current}, \max(\hat{X}_t))$, $X_t$ is the observed CPU usage pattern for some available time period t={0, 1 . . . . T−1}, $X_t$ is the predicted usage pattern for time period t={T, T+1, T+2 . . . }, and α is the subsequent autoscaling action at time T. When autoscaling based on predicted usage data, in embodiments, the augmented value, $\text{CoreCountCurrent}_{aug}$, is used to perform downstream functions (e.g., those associated with Equation 2), including, but not limited to, calculating of the slope, calculating the scaling factor, SF, and/or the like. Furthermore, in embodiments, the window size of the predicted usage, $\hat{X}_t$, may be a tunable parameter.

These and further embodiments are disclosed herein that enable the functionality described above and further such functionality. Such embodiments are described in further detail as follows.

Figure 1:
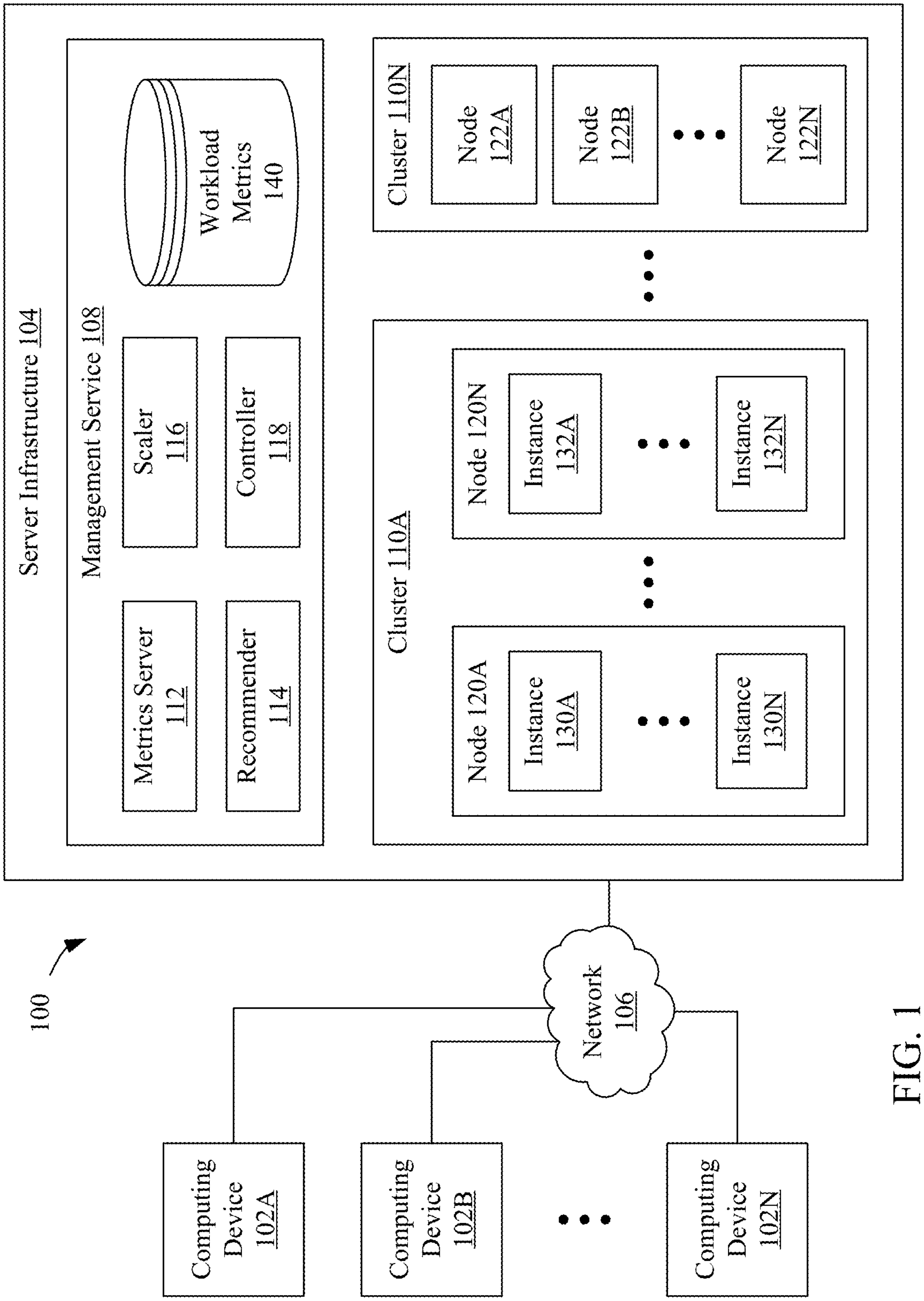
FIG. 1 shows a block diagram of an example system for vertical auto-scaling of a compute cluster, in accordance with an embodiment.

For instance, FIG. 1 shows a block diagram of an example system for vertical auto-scaling of a compute cluster, in accordance with an embodiment. As shown in FIG. 1, system 100 includes one or more computing devices 102A, 102B, and 102N (collectively referred to as "computing devices 102A-102N"), and a server infrastructure 104. Each of computing devices 102A-102N, and server infrastructure 104 are communicatively coupled to each other via network 106. Network 106 may comprise one or more networks such as local area networks (LANs), wide area networks (WANs), enterprise networks, the Internet, etc., and may include one or more wired and/or wireless portions. System 100 is described in further detail as follows.

Server infrastructure 104 may be a network-accessible server set (e.g., a cloud-based environment or platform). As shown in FIG. 1, server infrastructure includes management services 108, and clusters 110A-110N. Management services 108 further includes a metrics server 112, a recommender 114, a scaler 116, a controller 118, and workload metrics data 140. Clusters 110A-110N are each compute clusters (or "computer clusters") that include multiple compute nodes (computing devices or virtual machines), and are configured to perform computational workloads by request. In particular, cluster 110A includes one or more nodes 120A-122N, and cluster 120N includes one or more nodes 122A-122N. Each of clusters 110A-110N are accessible via network 106 (e.g., in a "cloud-based" embodiment) to build, deploy, and manage applications and services in node(s) 120A-120N, and 122A-122N, respectively. Each of nodes 120A-120N may include one or more instances 130A-130N and/or 132A-132N.

In an embodiment, one or more of clusters 110A-110N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 110A-110N may be a datacenter in a distributed collection of datacenters. In accordance with an embodiment, system 100 comprises part of the Microsoft® Azure® cloud computing platform, owned by Microsoft Corporation of Redmond, Washington, although this is only an example and not intended to be limiting.

Each of nodes 120A-120N, and 122A-122N may comprise one or more server computers, server systems, and/or computing devices. Each of nodes 1120A-120N, and 122A-122N may be configured to execute one or more software applications (or "applications") and/or services and/or manage hardware resources (e.g., processors, memory, etc.), which may be utilized by users (e.g., customers) of the network-accessible server set. Node(s) 120A-120N, and 122A-122N may also be configured for specific uses, including to execute virtual machines, machine learning workspaces, scale sets, databases, etc.

Each of instances 130A-130N, and 132A-132N may comprise an instance of an application for executing a workload. In embodiments, each of instances 130A-130N, and 132A-132N may include a Kubernetes® pod that comprises one or more containers. Each of instances 130A-130N, and 132A-132N may be vertically auto-scaled according to embodiments disclosed herein.

Management service 108 is configured to manage clusters 110A-110N, including to manage the distribution of clusters 110A-110N to users (e.g., individual users, tenants, customers, and other entities) of resources of server infrastructure 104. Management service 108 may be incorporated as a service executing on a computing device of server infrastructure 104. For instance, management service 110 (or a subservice thereof) may be configured to execute on any of node(s) 120A-120N, and/or 122A-122N. Alternatively, management service 108 (or a subservice thereof) may be incorporated as a service executing on a computing device external to server infrastructure 104.

Metrics server 112 is configured to obtain workload utilization data for workloads executing on node(s) 120A-120N, and/or 122A-122N and store the workload utilization data in workload metrics data 140. In embodiments, workload utilization data may include, but are not limited to, computations resource (e.g., CPU, GPU, etc.) utilization data, memory (e.g., RAM, ROM, etc.) utilization data, storage utilization data, Input/output (I/O) resource utilization data, and/or any other type of utilization data. In embodiments, the workload utilization data may include, but is not limited to, time-series data, including, for example, an amount of utilization of one or more resources associated with a time (e.g., timestamp) corresponding to the utilization.

Workload metrics data 140 is configured to store workload utilization data for workloads executing on node(s) 120A-120N, and/or 122A-122N. In embodiments, workload utilization data may include, but are not limited to, computations resource (e.g., CPU, GPU, etc.) utilization data, memory (e.g., RAM, ROM, etc.) utilization data, storage utilization data, Input/output (I/O) resource utilization data, and/or any other type of utilization data. In embodiments, the workload utilization data may include, but is not limited to, time-series data, including, for example, an amount of utilization of one or more resources associated with a time (e.g., timestamp) corresponding to the utilization.

Recommender 114 is configured to generate auto-scaling decisions. In embodiments, recommender 114 may determine, based on time-series workload utilization data, whether to trigger an auto-scaling of instance(s) 130A-130N and/or 132A-132N, and/or the amount of resources to scale up (or down) by (i.e., scaling factor). In embodiments, recommender 114 may determine a price-performance curve for a workload based on the workload utilization data and cost data (e.g., amount and/or cost of resources at various resource allocations). In embodiments, recommender 114 may consider various factors when determining calculating the scaling factor, such as, but not limited to, a slope of the price-performance curve at the current resource allocation, a skew of the distribution of slopes derived from the price-performance curve, an amount of resource slack (e.g., measured as a percentage of the current resource allocation), a minimum resource allocation, a maximum resource allocation, a maximum single step scale-up amount, a maximum single step scale-down amount; and/or a resource allocation slack amount.

Scaler 116 is configured to auto-scale instance(s) 130A-130N and/or 132A-132N based on auto-scale recommendations generated by recommender 114. For example, in embodiments, scaler 116 may provide an instruction and/or command to controller 118 to adjust the amount of resources allocatable to the workload.

Controller 118 is configured to auto-scale instance(s) 130A-130N and/or 132A-132N based on instructions and/or commands from scaler 116. In embodiments, controller 118 may auto-scale instance(s) 130A-130N and/or 132A-132N by adjusting the requests and limits specifications associated with a set of replicas (e.g., of a stateful application).

Computing devices 102A-102N may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of computing devices 102A-102N stores data and executes computer programs, applications, and/or services.

Users are enabled to utilize the applications and/or services (e.g., management service 110 and/or subservices thereof, services executing on node(s) 120A-120N, and/or 122A-122N) offered by the network-accessible server set via computing devices 102A-102N. For example, a user may be enabled to utilize the applications and/or services offered by the network-accessible server set by signing-up with a cloud services subscription with a service provider of the network-accessible server set (e.g., a cloud service provider). Upon signing up, the user may be given access to a portal of server infrastructure 104, not shown in FIG. 1. A user may access the portal via computing devices 102A-102N (e.g., by a browser application executing thereon). For example, the user may use a browser executing on computing device 102A to traverse a network address (e.g., a uniform resource locator) to a portal of server infrastructure 104, which invokes a user interface (e.g., a web page) in a browser window rendered on computing device 102A. The user may be authenticated (e.g., by requiring the user to enter user credentials (e.g., a username, password, PIN, etc.)) before being given access to the portal.

Upon being authenticated, the user may utilize the portal to perform various cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); configuring one or more of node(s) 120A-120N, and/or 122A-122N to operate as a particular server (e.g., a database server, OLAP (Online Analytical Processing) server, etc.), submitting queries (e.g., SQL queries) to databases of server infrastructure 104; etc. Examples of compute resources include, but are not limited to, virtual machines, virtual machine scale sets, clusters, ML workspaces, serverless functions, storage disks (e.g., maintained by storage node(s) of server infrastructure 104), web applications, database servers, data objects (e.g., data file(s), table(s), structured data, unstructured data, etc.) stored via the database servers, etc. The portal may be configured in any manner, including being configured with any combination of text entry, for example, via a command line interface (CLI), one or more graphical user interface (GUI) controls, etc., to enable user interaction.

Figure 2:
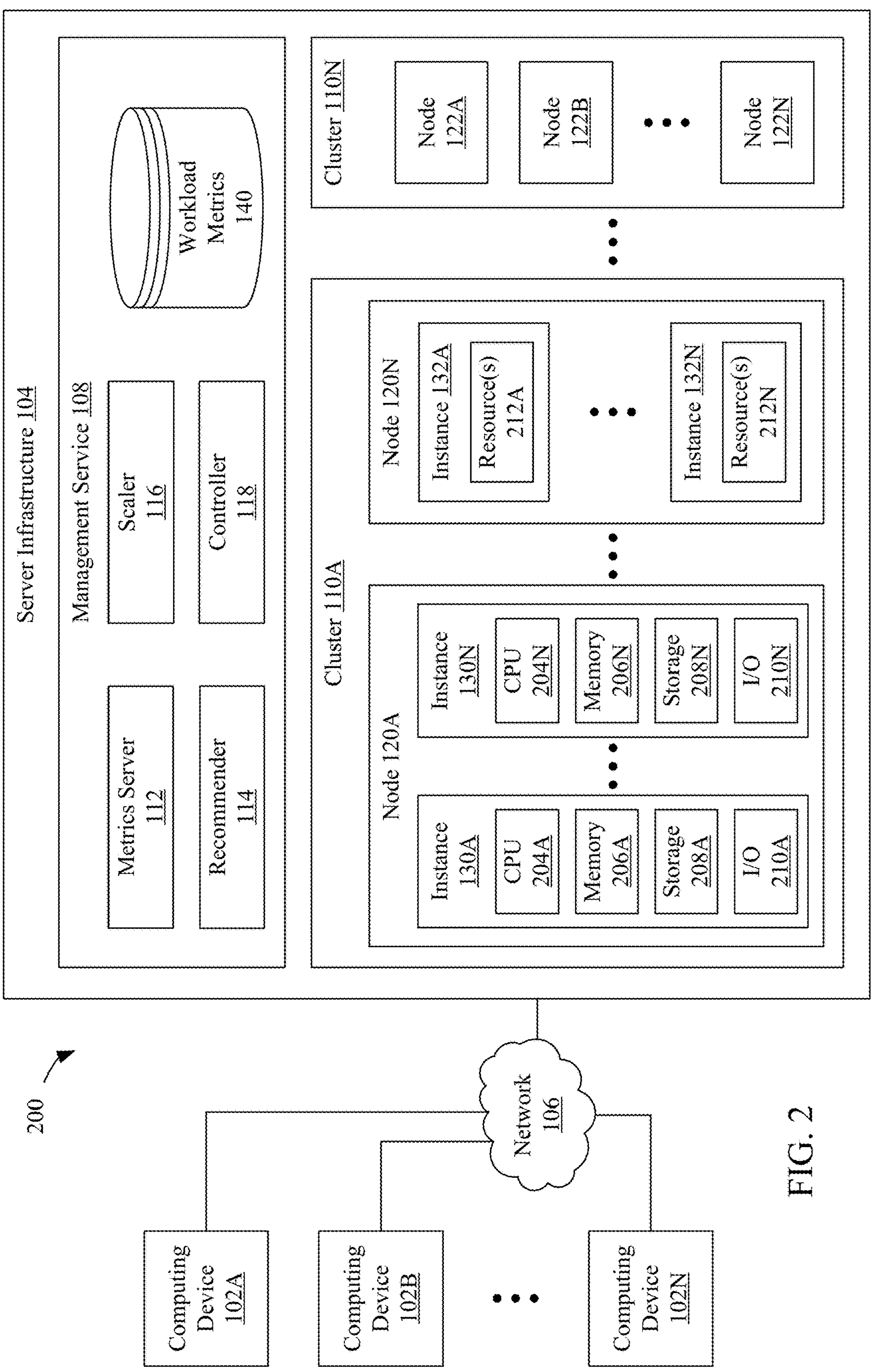
FIG. 2 depicts a block diagram of an example system for vertical auto-scaling of a compute cluster, in accordance with an embodiment.

Embodiments described herein may operate in various ways to determine a target size for a cluster. For instance, FIG. 2 depicts a block diagram of an example system 200 for vertical auto-scaling of a compute cluster, in accordance with an embodiment. As shown in FIG. 2, system 200 includes computing device(s) 102A-102N, server infrastructure 104, network 106, management service 108, cluster(s) 110A-110N, metrics server 112, recommender 114, scaler 116, controller 118, workload metrics 140, node(s) 120A-120N, node(s) 122A-122N, instance(s) 130A-130N, and instance(s) 132A-132N, as shown and described in conjunction with FIG. 1 above. As shown in FIG. 2, instance(s) 130A-130N further include one or more CPU resources 204A-204N, one or more memory resources 206A-206N, one or more storage resources 208A-208N, and/or one or more I/O resources 210A-210N. Furthermore, instance(s) 132A-132N further include one or more resources 212A-212N. System 200 is described in further detail as follows.

Instance(s) 130A-130N and/or 132A-132N may include one or more resources (e.g., CPU resource(s) 204A-204N, memory resource(s) 206A-206N, storage resource(s) 208A-208N, I/O resource(s) 210A-210N and/or resource(s) 212A-212N) for executing one or more workloads (i.e., applications). In embodiments, metrics server 112 may obtain workload utilization information for each of CPU resource(s) 204A-204N, memory resource(s) 206A-206N, storage resource(s) 208A-208N, I/O resource(s) 210A-210N and/or resource(s) 212A-212N and store such workload utilization information in workload metrics data 140. In embodiments, the workload utilization data may include, but is not limited to, time-series data, including, for example, an amount of utilization of one or more resources associated with a time (e.g., timestamp) corresponding to the utilization.

Figure 3:
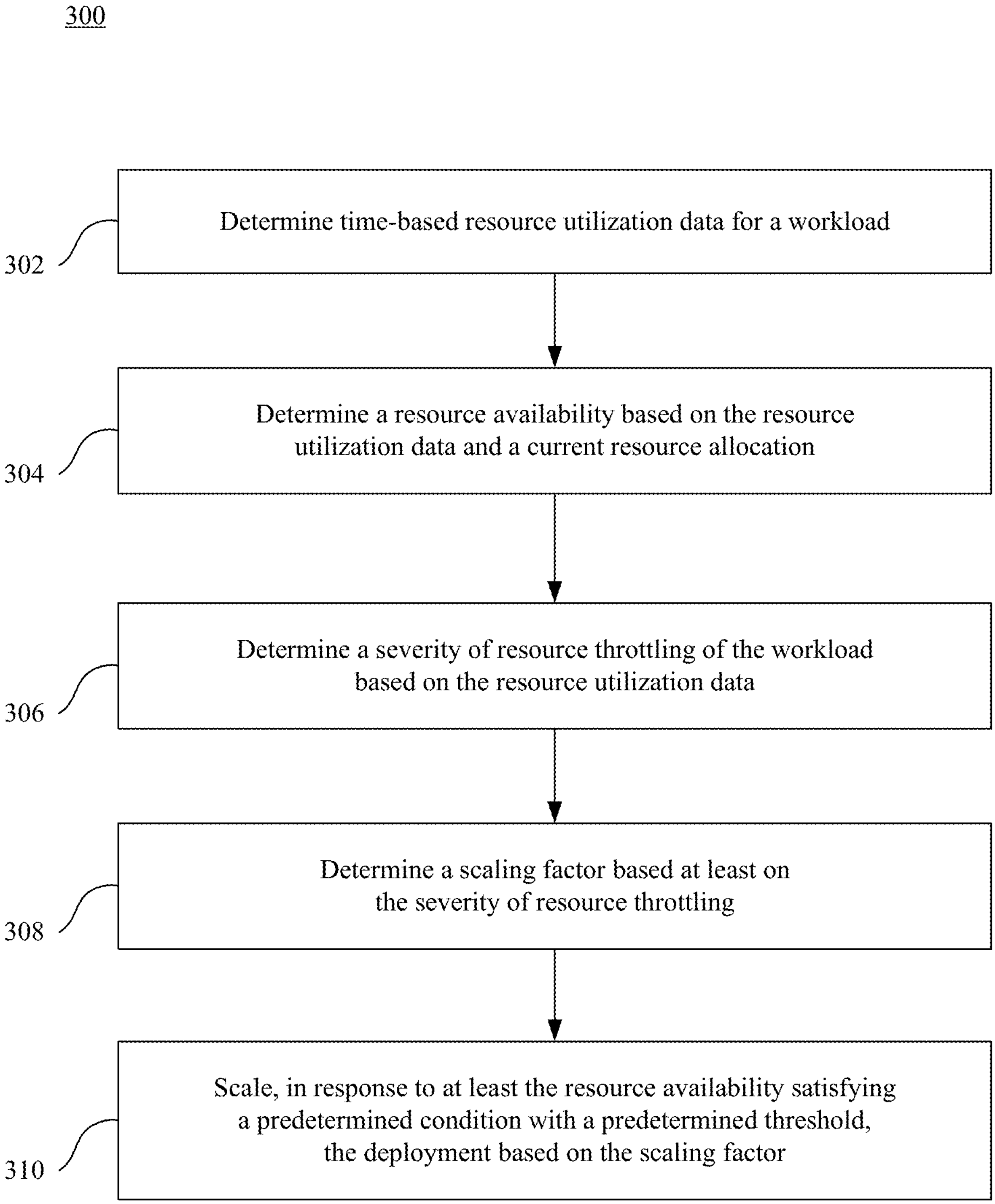
FIG. 3 depicts a flowchart of a process for vertical auto-scaling of compute instances, in accordance with an embodiment.

Embodiments described herein may operate in various ways to vertically auto-scale compute instances. For instance, FIG. 3 depicts a flowchart 300 of a process for vertical auto-scaling of a compute instance, in accordance with an embodiment. Server infrastructure 104, management services 108, metrics server 112, recommender 114, scaler 116, controller 118 and/or workload metrics data 140 of FIGS. 1 and/or 2 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1 and 2 for illustrative purposes.

Flowchart 300 starts at step 302. In step 302, time-based resource utilization data for a workload is determined. For example, metrics server 112 may obtain resource utilization data for a workload executing on instance(s) 130A-130N and/or 132A-132N and provide such resource utilization data to recommender 114, for example, by storing it in workload metrics data 140. In embodiments, recommender 114 may also obtain resource utilization data by predicting future resource utilization data. For example, recommender 114 may employ one or more prediction algorithms to determine projected resource utilization data based on observed or historical resource utilization data (e.g., workload metrics data 140).

In step 304, a resource availability is determined based on the resource utilization data and a current resource allocation. For example, recommender 114 may determine an amount of resource available based on the resource utilization information and a current resource allocation. In embodiments, the resource availability may be expressed as a percentage of the current resource allocation.

In step 306, a severity of resource throttling of the workload is determined based on the resource utilization data. For example, recommender 114 may determine, based on the resource utilization data, the severity of resource throttling of the workload. In embodiments, recommender 114 may make this determination based on a price-performance curve, as will be discussed in further detail below in conjunction with FIG. 4.

In step 308, a scaling factor is determined based at least on the severity of resource throttling. For example, recommender 114 may determine a scaling factor based at least on the severity of resource throttling. In embodiments, recommender 114 consider one or more guardrails, such as, but not limited to, a minimum amount of a resource allocatable to instance(s) 130A-130N and/or 132A-132N, a maximum amount of a resource allocatable to instance(s) 130A-130N and/or 132A-132N, a limit on the amount of resources that may be scaled-up in a single step, a limit on the amount of resources that may be scaled-down in a single step, a minimum amount of resource slack (e.g., spare capacity buffer), and/or a maximum amount of resource slack, when determining the scaling factor.

In step 310, in response to the resource availability satisfying a predetermined condition with a predetermined threshold, the deployment is scaled based on the scaling factor. For example, recommender 114 may recommend an auto-scaling action by the scaling factor in response to the resource availability satisfying a predetermined condition with a predetermined threshold. In embodiments, the predetermined condition may be satisfied when the resource availability is lower than a low slack threshold or higher than a high slack threshold. The low slack threshold and/or the high slack threshold may be determined manually (e.g., by a domain expert), automatically, and/or dynamically based on available information, such as, but not limited to, expertise in the field, historical workload data, a heuristic model, and/or a machine-learning model. In embodiments, the predetermined condition may be satisfied when the slope at the current resource allocation of the corresponding price-performance curve is lower than a low threshold or higher than a high threshold. For example, when the slope at the current resource allocation of the corresponding price-performance curve is higher than a high threshold a decision may be made to auto-scale up, and when the slope at the current resource allocation of the corresponding price-performance curve is lower than a low threshold, a decision may be made to auto-scale down. In embodiments, scaler 116 may initiate auto-scaling based on the recommendation from recommender 114 by providing an instruction and/or command to controller 118 to adjust the requests and/or limits specifications associated with the workload executing instance(s) 130A-130N and/or 132A-132N.

Figure 4:
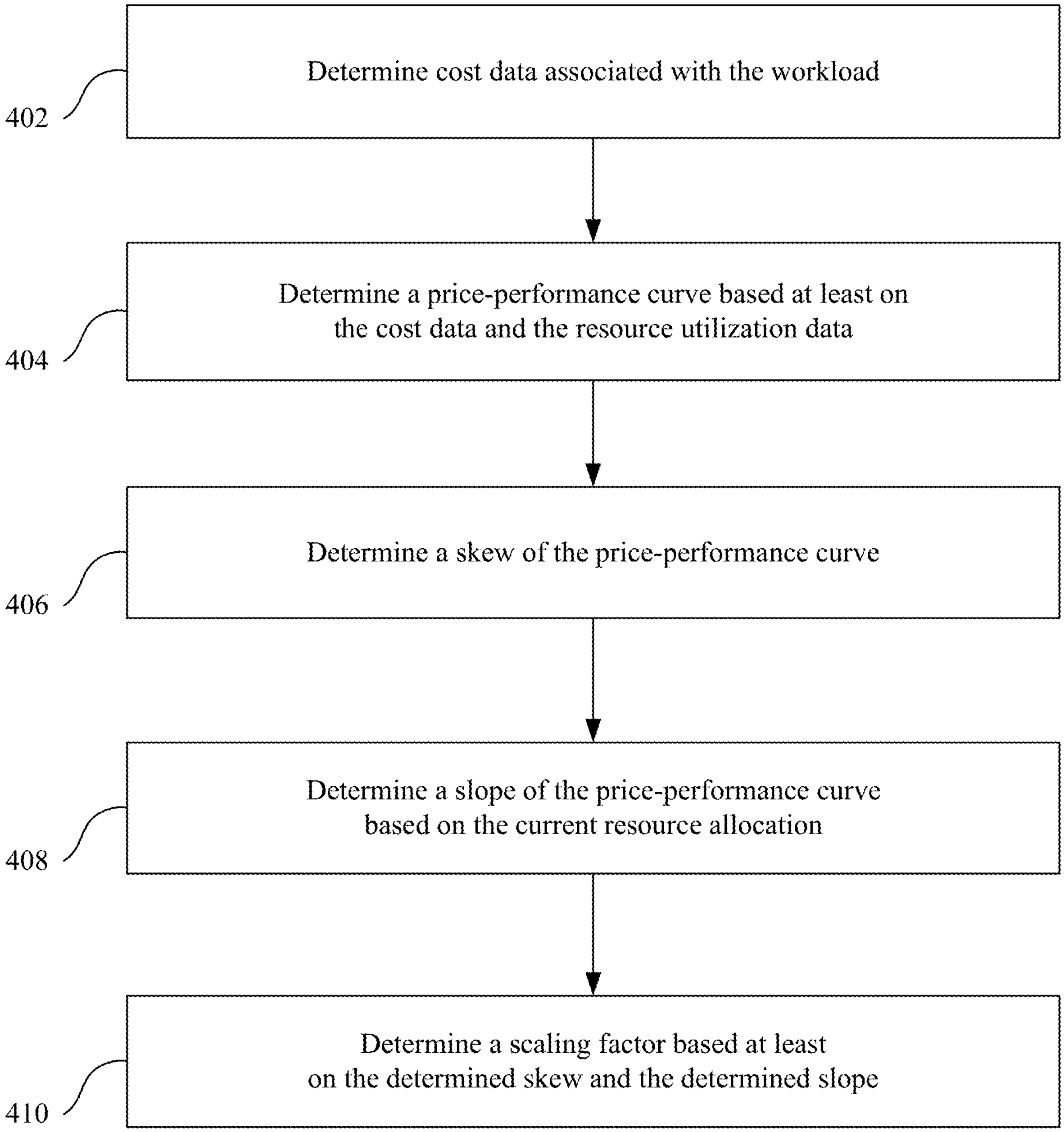
FIG. 4 depicts a flowchart of a process for determining a scaling factor based on a price-performance curve, in accordance with an embodiment.

Embodiments described herein may operate in various ways to vertically auto-scale compute instances. For instance, FIG. 4 depicts a flowchart 400 of a process for determining a scaling factor based on a price-performance curve, in accordance with an embodiment. Server infrastructure 104, management services 108, metrics server 112, recommender 114, scaler 116, controller 118 and/or workload metrics data 140 of FIGS. 1 and/or 2 may operate according to flowchart 400, for example. Note that not all steps of flowchart 400 may need to be performed in all embodiments, and in some embodiments, the steps of flowchart 400 may be performed in different orders than shown. Flowchart 400 is described as follows with respect to FIGS. 1 and 2 for illustrative purposes.

Flowchart 400 starts at step 402. In step 402, cost data associated with the workload is determined. For example, metrics server 112 may determine cost data associated with a workload executing on instance(s) 130A-130N and/or 132A-132N. In embodiments, cost data may be determined separately for each type of resource. Additionally, cost data may be determined as a quantity (e.g., number of and/or duration of) of resources allocated (i.e., paid for) and/or as a currency or monetary amount associated with the resources allocated (i.e., paid for).

In step 404, a price-performance curve is determined based at least on the cost data and the resource utilization data. For example, recommender 114 may determine a price-performance curve based at least on the cost data and the resource utilization data. In embodiments, recommender 114 may determine the price-performance curve by plotting the resource utilization data (i.e., resources consumed) against the cost data (i.e., resources paid for).

In step 406, a skew of the distribution of slopes derived from the price-performance curve is determined. For example, recommender 114 may determine the skew of the distribution of slopes derived from the price-performance curve based on statistical analysis of the price-performance curve. In embodiments, the skew of the distribution of slopes derived from the price-performance curve is a measure of the asymmetry of the distribution of the price-performance curve about its mathematical mean.

In step 408, a slope of the price-performance curve is determined based on the current resource allocation. For example, recommender 114 may determine the slope of the price-performance curve at the current resource allocation (i.e., resources paid for). This may be determined, in embodiments, by determining the slope of the price-performance curve at the current price (i.e., resources allocated or paid for).

In step 410, a scaling factor is determined based at least on the determined skew and the determined slope. For example, recommender 114 may determine a scaling factor (i.e., an amount of resources to scale up or scale down by) based on the determined skew and the determined slope. In embodiments, the scaling factor may be determined based on Equation 2, as discussed above. In embodiments, recommender 114 may consider one or more guardrails, such as, but not limited to, a minimum amount of a resource allocatable to instance(s) 130A-130N and/or 132A-132N, a maximum amount of a resource allocatable to instance(s) 130A-130N and/or 132A-132N, a limit on the amount of resources that may be scaled-up in a single step, a limit on the amount of resources that may be scaled-down in a single step, a minimum amount of resource slack (e.g., spare capacity buffer), and/or a maximum amount of resource slack, when determining the scaling factor. In embodiments, recommender 114 may provide an auto-scaling recommendation and/or the determined scaling factor to scaler 116 to instruct controller 118 to adjust the requests and limits specifications associated with the workload.

Embodiments described herein may operate in various ways to perform vertical auto-scaling based on price-performance curves. FIGS. 5A, 5B, and 5C depict exemplary price-performance curves 500, 510, and 520, respectively, for vertical auto-scaling of compute instances, in accordance with an embodiment. Server infrastructure 104, management services 108, metrics server 112, recommender 114, scaler 116, controller 118 and/or workload metrics data 140 of FIGS. 1 and/or 2 may operate according to price-performance curves 500, 510, and/or 520, for example. Price-performance curves 500, 510 and 520 are described as follows with respect to FIGS. 1 and 2 for illustrative purposes.

FIG. 5A depicts an exemplary price-performance curve 500 that may be generated by recommender 114. In embodiments, recommender 114 may generate price-performance curve 500 by plotting price-performance data 502, and determine the slope 504 of price-performance curve 500 based on the current resource allocation (i.e., price). In this instance, recommender 114 may determine that slope 504 is between a low slope threshold ($S_{low}$) and a high slope threshold ($S_{high}$), and recommend no scaling of instance(s) 130A-130N and/or 132A-132N.

FIG. 5B depicts an exemplary price-performance curve 510 that may be generated by recommender 114. In embodiments, recommender 114 may generate price-performance curve 510 by plotting price-performance data 512, and determine the slope 514 of price-performance curve 510 based on the current resource allocation (i.e., price). In this instance, recommender 114 may determine that slope 514 is less than or equal to the low slope threshold ($S_{low}$) and recommend scaling down the resources of instance(s) 130A-130N and/or 132A-132N.

FIG. 5C depicts an exemplary price-performance curve 520 that may be generated by recommender 114. In embodiments, recommender 114 may generate price-performance curve 520 by plotting price-performance data 522, and determine the slope 524 of price-performance curve 520 based on the current resource allocation (i.e., price). In this instance, recommender 114 may determine that slope 524 is higher than or equal to the high slope threshold ($S_{high}$) and recommend scaling up the resources of instance(s) 130A-130N and/or 132A-132N.

III. Example Mobile Device and Computer System Implementation

The systems and methods described above in reference to FIGS. 1-5, including computing device(s) 102, server infrastructure 104, network 106, management service 108, cluster(s) 110, metrics server 112, recommender 114, scaler 116, controller 118, node(s) 120, node(s) 122, instance(s) 130, instance(s) 132, workload metrics 140, CPU resource(s) 204, memory resource(s) 206, storage resource(s) 208, I/O resource(s) 210, resource(s) 212, and/or each of the components described therein, and the steps of flowcharts 300, and/or 400, and/or the price-performance curves depicted in FIGS. 5A-5C may be implemented in hardware, or hardware combined with one or both of software and/or firmware. For example, computing device(s) 102, server infrastructure 104, network 106, management service 108, cluster(s) 110, metrics server 112, recommender 114, scaler 116, controller 118, node(s) 120, node(s) 122, instance(s) 130, instance(s) 132, workload metrics 140, CPU resource(s) 204, memory resource(s) 206, storage resource(s) 208, I/O resource(s) 210, resource(s) 212, and/or each of the components described therein, and the steps of flowcharts 300, and/or 400, and/or the price-performance curves depicted in FIGS. 5A-5C may be each implemented as computer program code/instructions configured to be executed in one or more processors and stored in a computer readable storage medium. Alternatively, computing device(s) 102, server infrastructure 104, network 106, management service 108, cluster(s) 110, metrics server 112, recommender 114, scaler 116, controller 118, node(s) 120, node(s) 122, instance(s) 130, instance(s) 132, workload metrics 140, CPU resource(s) 204, memory resource(s) 206, storage resource(s) 208, I/O resource(s) 210, resource(s) 212, and/or each of the components described therein, and the steps of flowcharts 300, and/or 400, and/or the price-performance curves depicted in FIGS. 5A-5C may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Embodiments disclosed herein may be implemented in one or more computing devices that may be mobile (a mobile device) and/or stationary (a stationary device) and may include any combination of the features of such mobile and stationary computing devices. Examples of computing devices, such as system 100 of FIG. 1, in which embodiments may be implemented are described as follows with respect to FIG. 6. FIG. 6 shows a block diagram of an exemplary computing environment 600 that includes a computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows Computing device 602 can be any of a variety of types of computing devices. For example, computing device 602 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing one or more of computing device(s) 102, server infrastructure 104, network 106, management service 108, cluster(s) 110, metrics server 112, recommender 114, scaler 116, controller 118, node(s) 120, node(s) 122, instance(s) 130, instance(s) 132, workload metrics 140, CPU resource(s) 204, memory resource(s) 206, storage resource(s) 208, I/O resource(s) 210, resource(s) 212, and/or each of the components described therein, and the steps of flowcharts 300, and/or 400, and/or the price-performance curves depicted in FIGS. 5A-5C, described herein, including portions thereof, and/or further examples described herein.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi 662 modem (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform such as Amazon Web Services® of Amazon Web Services, Inc. or Google Cloud Platform™ of Google LLC, although these are only examples and are not intended to be limiting.

In an embodiment, computing device 602 may access application programs 676 for execution in any manner, such as by a client application and/or a browser at computing device 602. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

IV. Additional Example Embodiments

In an embodiment, a method includes: determining time-based resource utilization data for a workload executing on a deployment; determining a resource availability based on the resource utilization data and a current resource allocation; determining a severity of resource throttling of the workload based on the resource utilization data; determining a scaling factor based at least on the severity of resource throttling; and scaling, in response to at least the resource availability satisfying a predetermined condition with a predetermined threshold, the deployment based on the scaling factor.

In an embodiment, the method further includes: determining cost data associated with the workload; determining a price-performance curve based at least on the cost data and the resource utilization data; determining a skew of the distribution of slopes derived from the price-performance curve; and determining a slope of the price-performance curve based on the current resource allocation, wherein said determining the severity of resource throttling is based at least on the determined skew and the determined slope.

In an embodiment, the resource utilization data comprises at least one of: historical resource utilization data for the workload; or predicted resource utilization data for the workload.

In an embodiment, the predicted resource utilization data comprises resource utilization data determined using one or more of: a heuristic model; or a machine-learning model.

In an embodiment, determining the scaling factor is further based on one or more of: a minimum resource allocation; a maximum resource allocation; a minimum slope threshold; a maximum slope threshold; a maximum single step scale-up amount; a maximum single step scale-down amount; or a resource allocation slack amount.

In an embodiment, the resource utilization data comprises one or more of: computational resource utilization data; memory resource utilization data; request latency data; storage resource utilization information; or input/output (I/O) resource utilization data.

In an embodiment, scaling, in response the resource availability satisfying a predetermined condition with a predetermined threshold, the deployment based on the scaling factor comprises at least one of: increasing computational resources allocatable to the deployment; increasing memory resources allocatable to the deployment; increasing storage resources allocatable to the deployment; increasing input/output (I/O) resources allocatable to the deployment; decreasing computational resources allocatable to the deployment; decreasing memory resources allocatable to the deployment; decreasing storage resources allocatable to the deployment; or decreasing input/output (I/O) resources allocatable to the deployment.

In an embodiment, a system includes: a processor; and a memory device stores program code structured to cause the processor to: determine time-based resource utilization data for a workload executing on a deployment; determine a resource availability based on the resource utilization data and a current resource allocation; determine a severity of resource throttling of the workload based on the resource utilization data; determine a scaling factor based at least on the severity of resource throttling; and scale, in response to at least the resource availability satisfying a predetermined condition with a predetermined threshold, the deployment based on the scaling factor.

In an embodiment, the program code is further structured to cause the processor to: determine cost data associated with the workload; determine a price-performance curve based at least on the cost data and the resource utilization data; determine a skew of the distribution of slopes derived from the price-performance curve; and determine a slope of the price-performance curve based on the current resource allocation, wherein said determine the severity of resource throttling is based at least on the determined skew and the determined slope.

In an embodiment, the resource utilization data comprises at least one of: historical resource utilization data for the workload; or predicted resource utilization data for the workload.

In an embodiment, the predicted resource utilization data comprises resource utilization data determined using one or more of: a heuristic model; or a machine-learning model.

In an embodiment, determining the scaling factor is further based on one or more of: a minimum resource allocation; a maximum resource allocation; a minimum slope threshold; a maximum slope threshold; a maximum single step scale-up amount; a maximum single step scale-down amount; or a resource allocation slack amount.

In an embodiment, the resource utilization data comprises one or more of: computational resource utilization data; memory resource utilization data; request latency data; storage resource utilization information; or input/output (I/O) resource utilization data.

In an embodiment, to scale, in response the resource availability satisfying a predetermined condition with a predetermined threshold, the deployment based on the scaling factor, the program code is further structured to cause the processor to at least one of: increase computational resources allocatable to the deployment; increase memory resources allocatable to the deployment; increase storage resources allocatable to the deployment; increase input/output (I/O) resources allocatable to the deployment; decrease computational resources allocatable to the deployment; decrease memory resources allocatable to the deployment; decrease storage resources allocatable to the deployment; or decrease input/output (I/O) resources allocatable to the deployment.

In an embodiment, a computer-readable storage medium comprising computer-executable instructions, that when executed by a processor, cause the processor to: determine time-based resource utilization data for a workload executing on a deployment; determine a resource availability based on the resource utilization data and a current resource allocation; determine a severity of resource throttling of the workload based on the resource utilization data; determine a scaling factor based at least on the severity of resource throttling; and scale, in response to at least the resource availability satisfying a predetermined condition with a predetermined threshold, the deployment based on the scaling factor.

In an embodiment, the computer-readable instructions, when executed by the processor, further cause the processor to: determine cost data associated with the workload; determine a price-performance curve based at least on the cost data and the resource utilization data; determine a skew of the distribution of slopes derived from the price-performance curve; and determine a slope of the price-performance curve based on the current resource allocation, wherein said determine the severity of resource throttling is based at least on the determined skew and the determined slope.

In an embodiment, the resource utilization data comprises at least one of: historical resource utilization data for the workload; or predicted resource utilization data for the workload.

In an embodiment, the predicted resource utilization data comprises resource utilization data determined using one or more of: a heuristic model; or a machine-learning model.

In an embodiment, determining the scaling factor is further based on one or more of: a minimum resource allocation; a maximum resource allocation; a minimum slope threshold; a maximum slope threshold; a maximum single step scale-up amount; a maximum single step scale-down amount; or a resource allocation slack amount.

In an embodiment, the resource utilization data comprises one or more of: computational resource utilization data; memory resource utilization data; request latency data; storage resource utilization information; or input/output (I/O) resource utilization data.

In an embodiment, to scale, in response the resource availability satisfying a predetermined condition with a predetermined threshold, the deployment based on the scaling factor, the computer-readable instructions, when executed by the processor, further cause the processor to: increase computational resources allocatable to the deployment; increase memory resources allocatable to the deployment; increase storage resources allocatable to the deployment; increase input/output (I/O) resources allocatable to the deployment; decrease computational resources allocatable to the deployment; decrease memory resources allocatable to the deployment; decrease storage resources allocatable to the deployment; or decrease input/output (I/O) resources allocatable to the deployment.

V. Conclusion

References in the specification to "one embodiment." "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method, comprising:

determining time-based resource utilization data for a workload executing on a deployment, wherein the resource utilization data comprises one or more of: computational resource utilization data, memory resource utilization data, request latency data, storage resource utilization data, and input/output (I/O) resource utilization data;

determining a resource availability based on the resource utilization data and a current resource allocation;

determining a severity of resource throttling of the workload based on the resource utilization data;

determining a scaling factor based at least on the severity of resource throttling; and automatically scaling, in response to at least the resource availability satisfying a predetermined condition with a predetermined threshold, the deployment based on the scaling factor.

2. The method of claim 1, further comprising:

determining cost data associated with the workload;

determining a price-performance curve based at least on the cost data and the resource utilization data;

determining a skew of the distribution of slopes derived from the price-performance curve; and determining a slope of the price-performance curve based on the current resource allocation, wherein said determining the severity of resource throttling is based at least on the determined skew and the determined slope.

3. The method of claim 1, wherein the resource utilization data comprises at least one of:

historical resource utilization data for the workload; or predicted resource utilization data for the workload.

4. The method of claim 3, wherein the predicted resource utilization data comprises resource utilization data determined using one or more of:
a heuristic model; or
a machine-learning model.

5. The method of claim 1, wherein said determining the scaling factor is further based on one or more of:
a minimum resource allocation;
a maximum resource allocation;
a minimum slope threshold;
a maximum slope threshold;
a maximum single step scale-up amount;
a maximum single step scale-down amount; or
a resource allocation slack amount.

6. The method of claim 1, wherein said scaling, in response the resource availability satisfying a predetermined condition with a predetermined threshold, the deployment based on the scaling factor comprises at least one of:
increasing computational resources allocatable to the deployment;
increasing memory resources allocatable to the deployment;
increasing storage resources allocatable to the deployment;
increasing input/output (I/O) resources allocatable to the deployment;
decreasing computational resources allocatable to the deployment;
decreasing memory resources allocatable to the deployment;
decreasing memory resources allocatable to the deployment; or
decreasing input/output (I/O) resources allocatable to the deployment.

7. A system, comprising:
a processor; and
a memory device stores program code structured to cause the processor to:
determine time-based resource utilization data for a workload executing on a deployment, wherein the resource utilization data comprises one or more of:
computational resource utilization data, memory resource utilization data, request latency data, storage resource utilization data, and input/output (I/O) resource utilization data;
determine a resource availability based on the resource utilization data and a current resource allocation;
determine a severity of resource throttling of the workload based on the resource utilization data;
determine a scaling factor based at least on the severity of resource throttling; and
automatically scale, in response to at least the resource availability satisfying a predetermined condition with a predetermined threshold, the deployment based on the scaling factor.

8. The system of claim 7, wherein the program code is further structured to cause the processor to:
determine cost data associated with the workload;
determine a price-performance curve based at least on the cost data and the resource utilization data;
determine a skew of the distribution of slopes derived from the price-performance curve; and
determine a slope of the price-performance curve based on the current resource allocation,
wherein said determination of the severity of resource throttling is based at least on the determined skew and the determined slope.

9. The system of claim 7, wherein the resource utilization data comprises at least one of:
historical resource utilization data for the workload; or
predicted resource utilization data for the workload.

10. The system of claim 9, wherein the predicted resource utilization data comprises resource utilization data determined using one or more of:
a heuristic model; or
a machine-learning model.

11. The system of claim 7, wherein said determining the scaling factor is further based on one or more of:
a minimum resource allocation;
a maximum resource allocation;
a minimum slope threshold;
a maximum slope threshold;
a maximum single step scale-up amount;
a maximum single step scale-down amount; or
a resource allocation slack amount.

12. The system of claim 7, wherein to scale the deployment, the program code is further structured to cause the processor to at least one of:
increase computational resources allocatable to the deployment;
increase memory resources allocatable to the deployment;
increase storage resources allocatable to the deployment;
increase input/output (I/O) resources allocatable to the deployment;
decrease computational resources allocatable to the deployment;
decrease memory resources allocatable to the deployment;
decrease storage resources allocatable to the deployment; or
decrease input/output (I/O) resources allocatable to the deployment.

13. A computer-readable storage medium comprising computer-executable instructions, that when executed by a processor, cause the processor to:
determine time-based resource utilization data for a workload executing on a deployment, wherein the resource utilization data comprises one or more of: computational resource utilization data, memory resource utilization data, request latency data, storage resource utilization data, and input/output (I/O) resource utilization data;
determine a resource availability based on the resource utilization data and a current resource allocation;
determine a severity of resource throttling of the workload based on the resource utilization data;
determine a scaling factor based at least on the severity of resource throttling; and
automatically scale, in response to at least the resource availability satisfying a predetermined condition with a predetermined threshold, the deployment based on the scaling factor.

14. The computer-readable storage medium of claim 13, wherein the computer-readable instructions, when executed by the processor, further cause the processor to:
determine cost data associated with the workload;
determine a price-performance curve based at least on the cost data and the resource utilization data;
determine a skew of the distribution of slopes derived from the price-performance curve; and
determine a slope of the price-performance curve based on the current resource allocation, wherein said determination of the severity of resource throttling is based at least on the determined skew and the determined slope.

15. The computer-readable storage medium of claim 13, wherein the resource utilization data comprises at least one of:

historical resource utilization data for the workload; or predicted resource utilization data for the workload.

16. The computer-readable storage medium of claim 13, wherein said determining the scaling factor is further based on one or more of:

a minimum resource allocation;

a maximum resource allocation;

a minimum slope threshold;

a maximum slope threshold;

a maximum single step scale-up amount;

a maximum single step scale-down amount; or a resource allocation slack amount.

17. The computer-readable storage medium of claim 13, wherein to scale the deployment, the computer-readable instructions, when executed by the processor, further cause the processor to at least one of:

increase computational resources allocatable to the deployment;

increase memory resources allocatable to the deployment;

increase input/output (I/O) resources allocatable to the deployment;

increase storage resources allocatable to the deployment;

decrease computational resources allocatable to the deployment;

decrease memory resources allocatable to the deployment;

decrease storage resources allocatable to the deployment; or decrease input/output (I/O) resources allocatable to the deployment.

* * * * *